(12) United States Patent
Dupey (10) Patent No.: US 10,762,046 B2
(45) Date of Patent: Sep. 1, 2020

(54) MINIMUM ASSIGNMENT LEVEL

(71) Applicant: SAP SE, Walldorf (DE)

(72) Inventor: Ronald Dupey, Onalaska, WI (US)

(73) Assignee: SAP SE, Walldorf (DE)

(*) Notice: Subject to any disclaimer, the term of this patent is extended or adjusted under 35 U.S.C. 154(b) by 453 days.

(21) Appl. No.: 15/671,677

(22) Filed: Aug. 8, 2017

(65) Prior Publication Data
US 2019/0050415 A1 Feb. 14, 2019

(51) Int. Cl.
| G06F 17/00 | (2019.01) |
| G06F 16/17 | (2019.01) |
| G06F 16/95 | (2019.01) |
| G06F 16/215 | (2019.01) |

(52) U.S. Cl.
CPC .......... *G06F 16/17* (2019.01); *G06F 16/215* (2019.01); *G06F 16/95* (2019.01)

(58) Field of Classification Search
None
See application file for complete search history.

(56) References Cited

U.S. PATENT DOCUMENTS

| 4,794,635 | A | * | 12/1988 | Hess | H04W 72/085 455/513 |
| 5,260,526 | A | * | 11/1993 | Sirag, Jr. | B66B 1/2408 187/382 |
| 5,452,203 | A | * | 9/1995 | Moore | G06Q 99/00 |
| 7,590,544 | B2 | * | 9/2009 | Snapp | G06Q 10/08 705/317 |
| 10,043,582 | B2 | * | 8/2018 | Alhussien | G11C 29/50004 |
| 2001/0054031 | A1 | * | 12/2001 | Lee | B07C 3/00 705/406 |
| 2003/0093761 | A1 | * | 5/2003 | Bobba | G06F 30/367 716/115 |
| 2003/0182018 | A1 | * | 9/2003 | Snapp | G06Q 10/08 700/225 |
| 2004/0177305 | A1 | * | 9/2004 | Payne | G06Q 10/08 714/746 |
| 2009/0006394 | A1 | * | 1/2009 | Snapp | G06F 16/2468 |
| 2012/0150896 | A1 | * | 6/2012 | Sivakkolundhu | G06F 9/5038 707/769 |
| 2016/0224938 | A1 | * | 8/2016 | Shah | G06Q 10/0838 |

* cited by examiner

*Primary Examiner* — Hung D Le
(74) *Attorney, Agent, or Firm* — Sterne, Kessler, Goldstein & Fox P.L.L.C.

(57) ABSTRACT

Disclosed herein are system, method, and computer program product embodiments for assignment level address cleansing based on a minimum assignment level. An embodiment operates by receiving an address from a client device at an address cleansing system. The address cleansing system then parses the address into a plurality entry fields represent different geographic region fields. The address cleansing system then compares the entry fields to reference address data to determine an assignment level of the address. The assignment level indicates the level of address validation achieved based on the comparison to the reference address data. The assignment level is then compared to a minimum assignment level. If the assignment level is equal to or greater than the minimum assignment level, the address is cleansed using the reference address data. If not, the address is not cleansed.

20 Claims, 5 Drawing Sheets

MINIMUM ASSIGNMENT LEVEL

BACKGROUND

As society continues to develop data manipulation techniques, immediate verification of data has become possible. In some instances, verification includes cloud-based verification of information. This cloud-based data verification occurs via the "cleansing" of supplied data. Cleansing data may include validating received data and/or supplying missing information to provide a more complete representation of the data. For example, websites sometimes cleanse address data provided by users to obtain more accurate address representations.

At times, however, users and/or systems may submit mistaken cleanse requests, requesting a cleansed version of blank data, or mostly blank data, or unintentionally requesting cleansing services for incomplete data. Users and/or systems may also submit requests that are deficient in a manner where cleansing would provide no meaningful benefit. These deficient cleanse requests result in the wasteful usage of system resources to cleanse incomplete or deficient data. Further, when utilizing cleansing services requires monetary payment, funds are wasted on unintended cleanses. Preventing unintended cleanses may aid in preventing the wasteful allocation system resources as well as preventing wasteful spending on cleansing costs.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears

DETAILED DESCRIPTION

Provided herein are system, apparatus, device, method and/or computer program product embodiments, and/or combinations and sub-combinations thereof, for address cleansing based on a minimum assignment level.

In an embodiment, an address cleansing system utilizes a minimum assignment level to determine whether or not to cleanse a received address. Cleansing an address refers to validating a provided address using other reference information and/or supplementing and/or correcting the information contained within the provided address. To determine whether or not to cleanse a provided address, a user or administrator managing the address cleansing services may set a minimum assignment level. The minimum assignment level may represent a degree of validation related to the provided address and may also act as a threshold in determining whether to cleanse a received address.

In an embodiment, an address cleansing system may receive a client address entry from a client device seeking address cleansing. In an embodiment, the address cleansing system utilizes cloud-based processing to perform the address cleansing. After the address cleansing system receives the client address entry, the address cleansing system retrieves reference address data from a geographic reference database. The reference address data may be an independent address verification source. The address cleansing system compares the client address entry with the reference address data to determine an assignment level of the client address entry. The address cleansing system then compares the determined assignment level to the minimum assignment level. If the determined assignment level is equal to or greater than the minimum assignment level, the address cleansing system generates a cleansed address. If the determined assignment level is less than the minimum assignment level, the address cleansing system does not generate a cleansed address and instead generates a parsed and/or formatted version of the original client address entry. If the original client address entry was received from a client device, the address cleansing system may transmit the cleansed address to the client device when the assignment level is equal to or greater than the minimum assignment level or transmit the parsed and/or formatted version of the original client address entry to the client device.

In an embodiment, if the assignment level is equal to or greater than the minimum assignment level and the address cleansing system cleanses the client address entry, the address cleansing system stores a log of the cleansing transaction. In an embodiment, the address cleansing system may utilize this log to charge a monetary transaction cost to the client device and/or a user account associated with the client device for the address cleansing service. In an embodiment where a client server requests the address cleansing, the address cleansing system may charge an account associated with the client server. In an embodiment where the assignment level of the client address entry is less than the minimum assignment level, the address cleansing system does not cleanse the address and does not store a log of a cleansing transaction. Instead, the address cleansing system returns a parsed and/or formatted version of the original client address entry to the client device. The address cleansing system optionally also transmits an indication to the client device that the provided client address entry was not cleansed.

Based on the minimum assignment level, the address cleansing system may distinguish between client address entries that merit cleansing versus client address entries that do not merit cleansing. By not cleansing blank and/or deficient client address entries, the address cleansing system may avoid wasteful computational resources in generating a useless cleansing result and/or may avoid wasteful transaction costs associated with cleansing an address using geographic reference data.

Although described with reference to address cleansing, the embodiments of this disclosure may also be used in other data cleansing contexts. These contexts may include data cleansing based on available reference data. Users and/or administrators may set a minimum assignment level distinguishing between whether provided data should be cleansed. For example, the embodiments disclosed herein may be utilized to cleanse personal information, such as names, birthdays, and/or other identifying information, business information, such as hours of operation, number of employees, or phone numbers, and/or online transactional information.

These features will now be discussed with respect to the corresponding figures.

Figure 1:
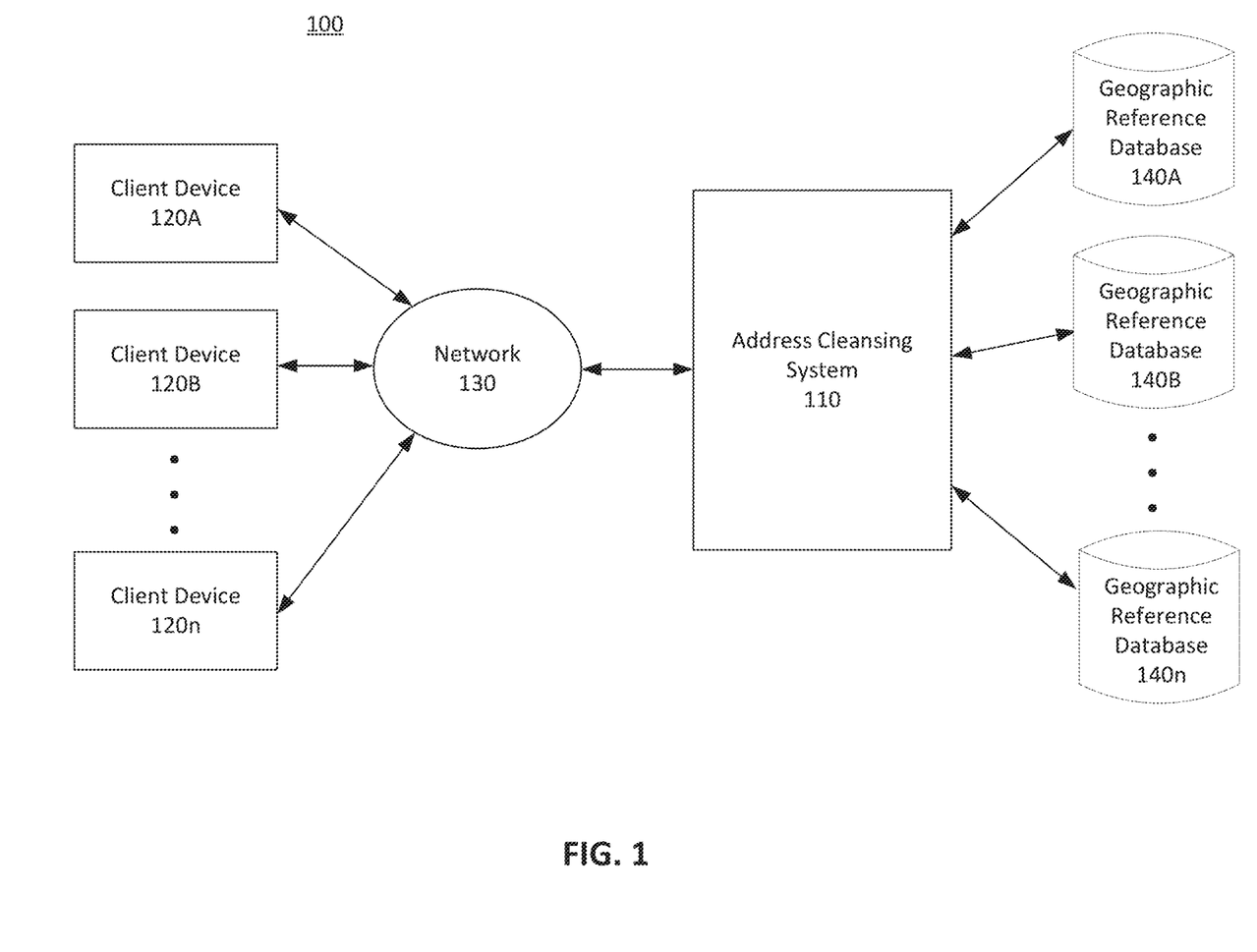
FIG. 1 is a block diagram of an address cleansing environment, according to some embodiments.

FIG. 1 is a block diagram of an address cleansing environment 100, according to some embodiments. Address cleansing environment 100 may represent an environment within which address cleansing system 110 operates to cleanse addresses and/or determine whether or not to cleanse addresses.

Address cleansing system 110 may include one or more processors, memory devices, buffers, databases, servers, routers, modems, antennae, and/or circuitry configured to interface with client devices 120, network 130, and/or geographic reference databases 140.

Client device 120 may be a computing platform, such as but not limited to smartphones, tablet computers, laptop computers, desktop computers, web browsers, and/or other computing devices, apparatuses, systems, or platforms. In an embodiment, client devices 120 are configured to supply addresses to address cleansing system 110 via network 130.

Network 130 may be a network capable of transmitting information either in a wired or wireless manner and may be, for example, the Internet, a Local Area Network, or a Wide Area Network. Network 130 may utilize a network protocol, such as, for example, a hypertext transfer protocol (HTTP), a TCP/IP protocol, Ethernet, or an asynchronous transfer mode. In an embodiment, network 130 facilitates communications between client devices 120 and address cleansing system 110. Based on communications and/or addresses received from a client device 120, address cleansing system 110 may interface with a geographic reference database 140 to retrieve reference address data for validation of client address entries.

Geographic reference databases 140 may be a database and/or other memory device storing geographic reference data. The geographic reference data may include data related to addresses, such as, for example, country, region, city, locality, street, house, floor, and/or unit information. In an embodiment, geographic reference databases 140 include other identifying information, such as, for example, a resident name, business name, and/or delivery instructions. This other identifying information may be associated with a corresponding address. Address cleansing system 110 may retrieve this reference address data from a geographic reference database 140 to validate client address entries provided by a client device 120.

In an embodiment, a geographic reference database 140 may belong to a third party that differs from the owner and/or administrator of address cleansing system 110. For example, the owner and/or administrator of address cleansing system 110 may provide address cleansing services to client device 120 while the owners and/or administrators of a geographic reference database 140 may specialize in the aggregation of address information. For example geographic reference database 140A may include reference address data related to a first country while geographic reference database 140B may include reference address data related to a second country. In an embodiment, a geographic reference database 140 may include Global Positioning System (GPS) information and/or Global Navigation Satellite System (GNSS) information.

These geographic reference databases 140 may belong to different owners that may differ from each other as well as differ from the owner of address cleansing system 110. In an embodiment, to communicate and/or retrieve reference address data from geographic reference databases 140, address cleansing system 110 may utilize network 130.

In an embodiment, address cleansing system 110 may operate under a contract with a geographic reference database 140. For example, address cleansing system 110 may operate in a manner that tracks royalty payments based on the usage of reference address data from a geographic reference database 140 to cleanse client address entries provided by client devices 120. In this embodiment, address cleansing system 110 may track and/or log instances where address cleansing system 110 has cleansed an address on behalf of a client device 120. Based on this log, address cleansing system 110 may generate a transaction report and/or invoice that address cleansing system 110 may deliver to a client device 120. This invoice may represent a royalty payment intended to be delivered to the owner of a geographic reference database 140 as a compensation for providing reference address data to address cleansing system 110. In an embodiment, address cleansing system 110 logs transaction instances of cleansing for payment purposes but does not log a transaction when an address is not cleansed.

In an embodiment, geographic reference databases 140 are commonly owned and/or interfaced with address cleansing system 110. For example, the owner and/or administrator of address cleansing system 110 also aggregates address information and stores the information in a geographic reference database 140. Although the example of FIG. 1 depicts address cleansing system 110 as a separate object from geographic reference database 140, in an embodiment, address cleansing system 110 and geographic reference database 140 may share and/or comprise the same hardware components.

To perform address cleansing and/or determine whether to perform address cleansing, address cleansing system 110 retrieves reference address data from a geographic reference database 140. In an embodiment, address cleansing system 110 retrieves the reference address data before receiving a client address entry from a client device 120. For example, address cleansing system 110 may pre-load the reference address data retrieved from one or more geographic reference databases 140 in memory internal to address cleansing system 110. In this case, address cleansing system 110 may be able to more quickly cleanse addresses and/or determine whether to cleanse addresses because the reference address data is already locally stored in address cleansing system 110.

In an embodiment, address cleansing system 110 may not store the reference address data prior to receiving a client address entry. In this embodiment, address cleansing system 110 may retrieve reference address data in response to receiving a client address entry from a client device 120. In this embodiment, the reference address data remains stored in a respective geographic reference database 140 until the reference address data is retrieved to cleanse an address or to determine whether to cleanse an address. This embodiment may allow for greater confidentiality and/or control by the owners/administrators of the geographic reference databases 140 to prevent address cleansing system 110 from gaining full access to the stored reference address data.

Based on client address entries received from client devices 120 and reference address data received from geographic reference databases 140, address cleansing system 110 may determine whether to cleanse the client address entry. In an embodiment, address cleansing system 110 determines whether or not to cleanse a client address entry based on a minimum assignment level. An assignment level refers to a level of validation associated with a client address entry. When address cleansing system 110 receives a client address entry, address cleansing system 110 may analyze the client address entry to determine an assignment level associated with the client address entry. In an embodiment, address cleansing system 110 utilizes reference address data from a geographic reference database 140 to validate the data of the client address entry and determine an associated assignment level. An embodiment describing a method for determining an assignment level is described in further detail with reference to FIG. 3B.

In addition to determining the assignment level of the client address entry, address cleansing system 110 also compares the assignment level to a minimum assignment level. In an embodiment, a minimum assignment level is a threshold utilized by address cleansing system 110 to determine whether or not to cleanse a client address entry. Address cleansing system 110 compares a determined assignment level of a client address entry to the minimum assignment level to make this determination. In an embodiment, if address cleansing system 110 determines that the determined assignment level is equal to or greater than the minimum assignment level, address cleansing system 110 will cleanse the address information of the client address entry. If address cleansing system 110 determines that the determined assignment level is less than the minimum assignment level, address cleansing system 110 will not cleanse the address information. An embodiment describing a method for assignment level address cleansing is described in further detail with reference to FIG. 3A.

In an embodiment, the minimum assignment level is set by a client device 120. A client device 120 may transmit a command to address cleansing system 110 to set the minimum assignment level. In an embodiment, address cleansing system 110 may store minimum assignment level associations in memory for use in cleansing client address entries. When a client device 120 sets a minimum assignment level, the minimum assignment level may be applicable to other client devices 120 or may be applicable only to the client device 120 setting the minimum assignment level. For example, client device 120A may set a minimum assignment level for use in determining whether to cleanse client address entries submitted by client device 120A. In an embodiment, client device 120A may set a minimum assignment level for use in cleansing other client devices 120B, . . . , 120n. In an embodiment, an address cleansing system 110 administrator may set the minimum assignment level.

In an embodiment, different client devices 120 may be associated with different minimum assignment levels. For example, address cleansing system 110 may associate client device 120A with a higher minimum assignment level than the minimum assignment level of client device 120B. Different minimum assignment levels may represent differences in acceptable tolerances for address cleansing. For example, if client device 120B is associated with a lower minimum assignment level relative to client device 120A, address cleansing system 110 may cleanse client address entries received from client device 120B meeting the minimum assignment level of client device 120B but may not cleanse the same client address entries if received from client device 120A due to the higher minimum assignment level associated with client device 120A. This variation allows client devices 120 to set and/or be associated with different minimum assignment levels and control the types of client address entries that will be cleansed.

Figure 2:
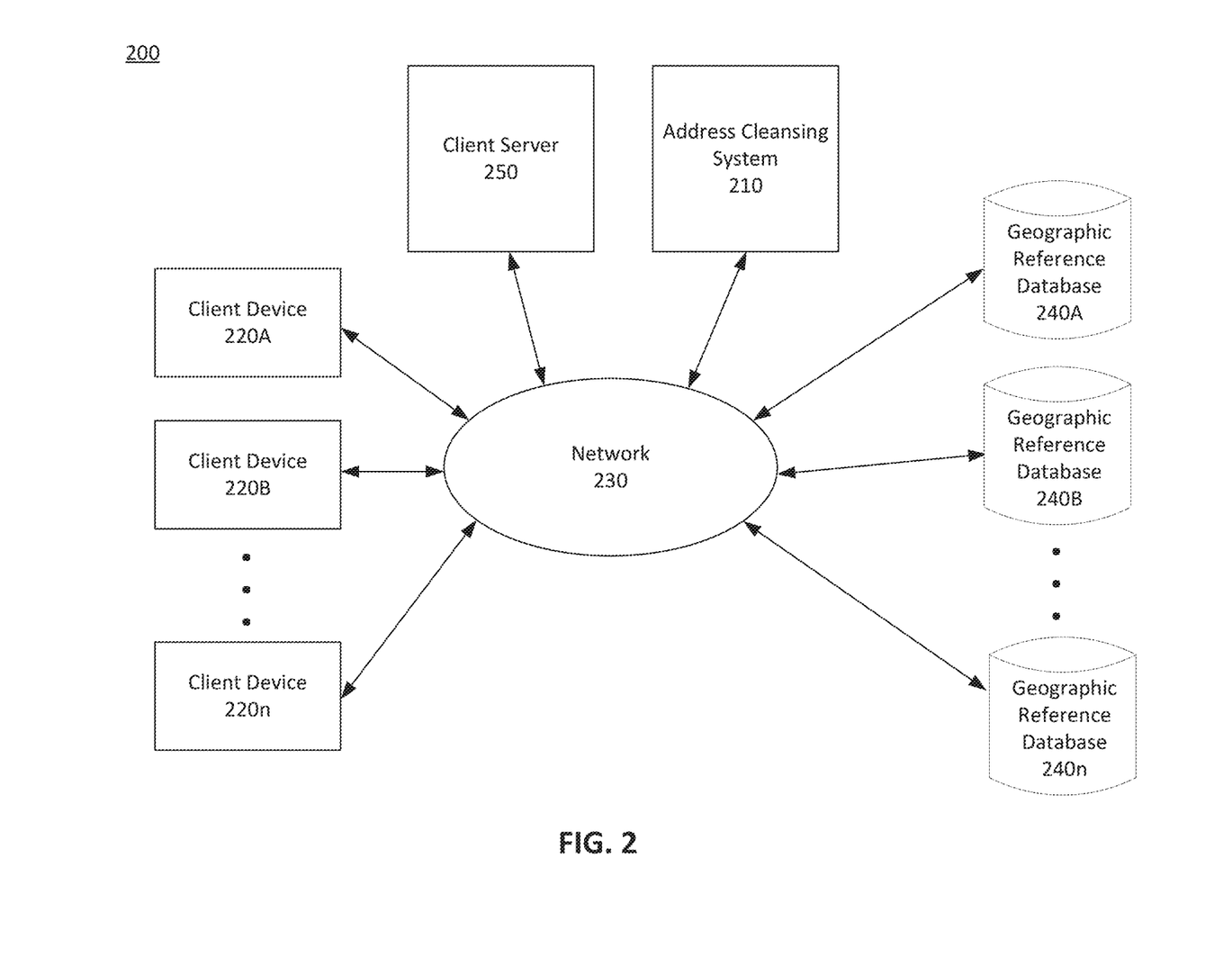
FIG. 2 is a block diagram of an address cleansing environment, including a client server, according to some embodiments.

FIG. 2 is a block diagram of an address cleansing environment 200 including a client server 250, according to some embodiments. The components of address cleansing environment 200 operate in a manner similar to the components associated with address cleansing environment 100. For example, address cleansing system 210 includes similar hardware and/or software to address cleansing system 110. Client devices 220 are similar to client devices 120. Network 230 is similar to network 130. Geographic reference databases 240 are similar to geographic reference database 140.

In terms of differences, the embodiments described with reference to address cleansing environment 200 include a client server 250. Client server 250 may include one or more processors, memory devices, buffers, databases, servers, routers, modems, antennae, and/or circuitry configured to interface with address cleansing system 210, client devices 220, network 230, and/or geographic reference databases 240.

In an embodiment, client server 250 directs communications with client devices 220 and generates client address entries on behalf of the client devices 220. Client server 250 may receive addresses and/or address cleansing requests from client devices 220. Client server 250 may package and/or format these addresses and/or address cleansing requests in a manner readable by address cleansing system 210, such as, for example, a client address entry. In an embodiment, client server 250 transmits the client address entries to address cleansing system 210 for address cleansing via network 230.

In an embodiment, client server 250 may determine whether addresses received from client devices 220 are worthy of address cleansing. For example, client server 250 may utilize reference address data from a geographic reference database 240 to perform a minimum assignment level analysis as described with reference to FIG. 3A. If an assignment level associated with an address provided by a client device 220 does not meet a minimum assignment level, client server 250 will formulate a client address entry to be cleansed at address cleansing system 210. If the assignment level is equal to or greater than the minimum assignment level, however, client server 250 will transmit a client address entry to address cleansing system 210 to cleanse the address provided by the client device 220. In this embodiment, address cleansing system 210 need not determine whether cleansing is appropriate because client server 250 has already determined that cleansing is appropriate. Pursuant to a command received from client server 250, address cleansing system 210 can cleanse the address using internally stored geographic reference data and/or reference address data retrieved from a geographic reference database 240.

Address cleansing environment 200 may be useful in situations where client devices 220 are not able to communicate with address cleansing system 210 directly. For example, client devices 220 may be configured to communicate with client server 250 but not directly communicate with address cleansing system 210 because address cleansing system 210 is a feature employed by client server 250. For example, client server 250 may be owned and/or operated by a first owner while address cleansing system 210 may be owned and/or operated by a different owner. In this case, while client server 250 may interact with both client devices 220 and address cleansing system 210, client devices 220 may not directly interact with address cleansing system 210.

For example, client server 250 may be utilized by an online retailer to facilitate online retail transaction. Part of the process of completing transactions may include receiving address information from a client device 220 to complete a shipping order. If client server 250 is configured to utilize the address cleansing capabilities of address cleansing system 210, client server 250 may transmit the address received from the client device 220 to the address cleansing system 210. Prior to transmitting, however, client server 250 may perform a minimum assignment level analysis to determine if the address provided by the client device 220 has enough merit to request cleansing. If so, client server 250 will transmit the address to address cleansing system 210 for cleansing. If not, client server 250 will not request an address cleansing and may instead reject the address and/or inform the client device 220 of the lack of acceptable address. In an embodiment, client server 250 may indicate to the client device 220 that the client device 220 has not provided sufficient address detail and/or the address provided conflicts with reference address data. In an embodiment, client server 250 may receive from the client device 220 an updated address and/or a confirmation the originally provided address is correct. Client server 250 may utilize the newly provided address and/or perform another minimum assignment level check to determine whether the newly provided address should also be cleansed.

In an embodiment, if client server 250 determines that an address should be cleansed, for example via the method described with reference to FIG. 3A and FIG. 3B, client server 250 transmits the address to address cleansing system 210. Address cleansing system 210 may then cleanse the address, validating the information provided and/or supplementing the information provided using internally stored reference address data and/or reference address data retrieved from a geographic reference database 240. Once the address is cleansed, address cleansing system 210 may transmit the cleanse address to client server 250 via network 230. Client server 250 may utilize the cleansed address to, for example, complete the shipping information and/or to complete the online retail transaction. In an embodiment, client server 250 transmits the cleansed address to client device 220 to confirm that the cleansed address is acceptable. Client device 220 may indicate whether the cleansed address is acceptable via a message sent to client server 250.

The example of FIG. 2 depicts an embodiment where client server 250 is an object separate from address cleansing system 210. In this embodiment, client server 250 communicates with address cleansing system 210 via network 230. This embodiment may be utilized when ownership of client server 250 differs from ownership of address cleansing system 210. In an embodiment, address cleansing system 210 may operate to provide cloud-based address cleansing services to client server 250.

Although depicted as separate objects in FIG. 2, in an embodiment, client server 250 may share components with address cleansing system 210. For example, client server 250 may be implemented using the same hardware components and/or may share a portion of the same components. This embodiment may be utilized when ownership is common between client server 250 and address cleansing system 210. In an embodiment, client server 250 and/or address cleansing system 210 may operate together to provide cloud-based address cleansing services to client devices 220.

Figure 3A:
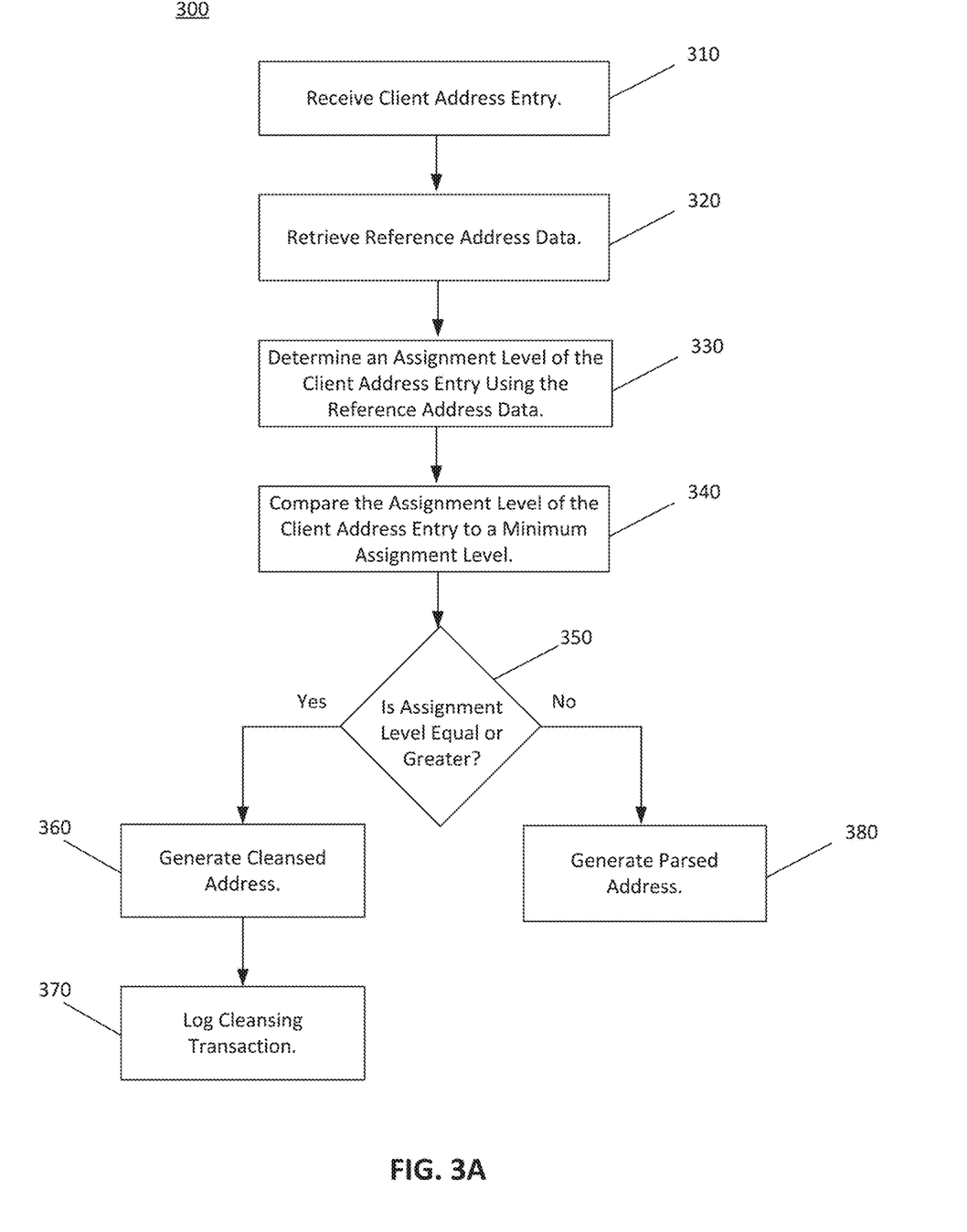
FIG. 3A is a flowchart illustrating a method for assignment level address cleansing, according to some embodiments.

FIG. 3A is a flowchart illustrating a method 300 for assignment level address cleansing, according to some embodiments. Method 300 shall be described with reference to FIG. 1. However, method 300 is not limited to that example embodiment.

Address cleansing system 110 may utilize method 300 to determine whether or not to cleanse an address. The foregoing description will describe an embodiment of the execution of method 300 with respect to address cleansing system 110. While method 300 may be described with reference to address cleansing system 110, method 300 may be executed on any computing device, such as, for example, client server 250 and/or the computer system described with reference to FIG. 4 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 3A, as will be understood by a person of ordinary skill in the art.

At 310, address cleansing system 110 may receive a client address entry from a client device 120 via network 130. The client address entry may include address information. In an embodiment, the client address entry may include a blank entry field, incomplete address information, and/or deficient address information. For example, a client device 120 may transmit an unintended address to address cleansing system 110. In an embodiment, the client address entry may represent a "best guess" address submitted by a client device 120 to address cleansing system 110 for potentially supplementing missing and/or incorrect address data.

At 320, address cleansing system 110 may retrieve reference address data. In an embodiment, address cleansing system 110 retrieves the reference address data from a geographic reference database 140. In an embodiment, the reference address data may be retrieved from internal memory by one or more processors of address cleansing system 110. In an embodiment, the reference address data represents a validated data source containing sourced address information. For example, the reference address data may be locally sourced data generate from aggregated address data. Address cleansing system 110 may interface with various geographic reference databases 140 to obtain reference address data related to different countries and/or regions. The reference address data may also span various degrees of granularity regarding specific address elements, such as, for example, a house number or an apartment unit number. In an embodiment, retrieving the reference address data provides address cleansing system 110 with a data source for comparison with client address entries retrieved from client devices 120. In an embodiment, address cleansing system 110 may retrieve reference address data in response to receiving a client address entry.

In an embodiment, address cleansing system 110 may retrieve reference address data independent from a receipt of a client address entry. For example, address cleansing system 110 may preload the reference address data retrieved from geographic reference databases 140. In an embodiment, address cleansing system 110 may periodically update stored reference address data and/or may periodically query geographic reference databases 140 for updated reference address data. In an embodiment, address cleansing system 110 may periodically receive updated reference address data from geographic reference databases 140.

At 330, address cleansing system 110 may determine an assignment level of the client address entry using the reference address data. An embodiment of this determination is further described with reference to FIG. 3B. Address cleansing system 110 determines the assignment level of the client address entry based on the information contained in various entry fields of the client address entry. Address cleansing system 110 may utilize the reference address data to validate each of the various entry fields to determine the accuracy of the client address entry relative to the reference address data.

Address cleansing system 110 may utilize an iterative process to arrive at the correct assignment level. The assignment level of the client address entry may represent the degree to which address cleansing system 110 can validate the information included in the client address entry.

For example, the assignment level may reflect a top-down validation of a client address entry. Table 1 demonstrates an example embodiment where entry fields of the client address entry are validated in a linear manner.

TABLE 1

| Assignment Level | Validation |
|---|---|
| X | Unknown or unassigned. |
| C | The address is validated to the country. |
| R | The address is validated to the region. |
| L1 | The address is validated to the city (locality). |
| L2 | The address is validated to the second level of city information (locality2). |
| L3 | The address is validated to the third level of city information (locality3). |
| L4 | The address is validated to the fourth level of city information (locality4). |
| PN | The address is validated to the street or primary name. |
| PR | The address is validated to the house number or primary range. |
| S | The address is validated through the secondary address information (floor, unit, etc.). |

In an embodiment, address cleansing system 110 may iteratively check the entry field representing the widest geographic area and validate each entry field to the narrowest available geographic area. For example, address cleansing system 110 may first compare a country entry field with country reference address data. If address cleansing system 110 is able to validate the country reference data, address cleansing system 110 may continue to validate the next narrower geographic area entry field, such as, for example, a region, state, and/or province. If address cleansing system 110 is able to validate this entry field, address cleansing system 110 may continue validation based on a city, locality, street, house number, and/or secondary address information, such as a business name, floor, and/or unit number.

The assignment level of the client address entry may reflect completion of the validation process and that the entry fields of the client address entry have been validated. In an embodiment, however, address cleansing system 110 may note a deficiency with an entry field and/or may be unable to validate an entry field. Based on this error, address cleansing system 110 may cease the validation process and determine the assignment level of the client address entry to be equivalent to the level associated with the error. For example, address cleansing system 110 may be able to validate the country, region, and city entry fields but may recognize an error with the street entry field. For example, the street provided in the client address entry may not exist in the noted city based on the reference address data. In an embodiment, the entry field for the street may be partially correct, such as, for example listing "Pleasant Street" when the reference address data recognizes "Pleasant Lane" as the correct street name. In these cases, when an error occurs, address cleansing system 110 notes the error and assigns the corresponding assignment level to the client address entry. In an embodiment, the assignment level may be data appended to the client address entry and/or may be a value utilized internally be address cleansing system 110. In the case where address cleansing system 110 detects an error with the street name, address cleansing system records this error as the assignment level associated with the client address entry. In an embodiment, the assignment level indicates that the wider geographic areas have been validated but the current entry field (e.g., the street) has not been validated. In an embodiment, this assignment level may also indicate that narrower geographic identifiers (such as the house number and/or secondary address information) has also not been validated.

In this manner, at 330, address cleansing system 110 determines the assignment level metric to determine the quality of the received client address entry. Using the assignment level, address cleansing system 110 may determine whether or not the received client address entry should be cleansed.

At 340, address cleansing system 110 compares the assignment level of the client address entry to a minimum assignment level. At 350, address cleansing system 110 determines whether the assignment level of the client address entry is equal to, greater than, or less than the minimum assignment level. The minimum assignment level may be a threshold utilized by address cleansing system 110 to determine whether or not to cleanse the client address entry.

In an embodiment, the minimum assignment level is set by a client device 120. A client device 120 may transmit a command to address cleansing system 110 to set the minimum assignment level. In an embodiment, address cleansing system 110 may store minimum assignment level associations in memory for use in cleansing client address entries. When a client device 120 sets a minimum assignment level, the minimum assignment level may be applicable to other client devices 120 or may be applicable only to the client device 120 setting the minimum assignment level. For example, client device 120A may set a minimum assignment level for use in determining whether to cleanse client address entries submitted by client device 120A. In an embodiment, client device 120A may set a minimum assignment level for use in cleansing other client devices 120B, . . . , 120n. In an embodiment, an address cleansing system 110 administrator may set the minimum assignment level.

At 340, address cleansing system 110 compares the assignment level of the client address entry to the minimum assignment level corresponding to the client device 120 that transmitted the client address entry. At 350, address cleansing system 110 determines whether the assignment level of the client address entry is equal to, greater than, or less than the minimum assignment level. Address cleansing system 110 may perform this determination using an integer representation of the assignment level and/or a character representation of the assignment level. In an embodiment, the minimum assignment level may represent an acceptable approximation of an address to warrant address cleansing services. Table 2 represents an embodiment of possible minimum assignment levels. A minimum assignment level of "zero" or "none" represents the embodiment where address cleansing system 110 will attempt to cleanse the client address entry without first checking the assignment level.

TABLE 2

| Assignment Level | Integer Representation |
|---|---|
| X or [None] | 0 |
| C | 1 |
| R | 2 |

TABLE 2-continued

| Assignment Level | Integer Representation |
|---|---|
| L1 | 3 |
| L2 | 4 |
| L3 | 5 |
| L4 | 6 |
| PN | 7 |
| PR | 8 |
| S | 9 |

For example, for a client device 120A, if an client address entry is able to be validated to the city, such that the assignment level associated with client address entry indicates that the city entry field was validated, client device 120A may indicate that this level of validation is sufficient to warrant address cleansing services. Thus, when address cleansing system 110 is able to validate city information based on client address entries received from client device 120A, address cleansing system will proceed to generate a cleansed address at 360. The minimum assignment level associated with client device 120A reflects this instruction to generate a cleansed address when the city information is validated. In an embodiment, even if an error occurs when validating the street, house number, or secondary address information entry fields, client device 120A has already indicated that validation of the city entry field is sufficient as the minimum assignment level.

In an embodiment, the minimum assignment level associated with client device 120B may require validation through the street entry field to warrant generating a cleansed address. In this case, if an error occurs with attempting to validate the street entry field of a client address entry received from client device 120B, address cleansing system 110 may generate an assignment level indicating the street entry field error at 330. At 340, address cleansing system 110 compares the assignment level with the minimum assignment level associated with client device 120B. In this case, because the minimum assignment level associated with client device 120B requires validation of the street entry field and because the assignment level of the client address entry does not meet this minimum assignment level, address cleansing system 110 will not cleanse the client address entry.

When an assignment level of a client address entry is less than an associated minimum assignment level, address cleansing system 110 does not perform an address cleansing function and prevents wasteful system resources as well as potentially wasteful monetary charges associated with the address cleansing service. In this respect, deficient and/or incomplete client address entries are not needlessly cleansed.

Based on the determination of whether the assignment level of a given client address entry is equal to or greater than the minimum assignment level, address cleansing system 110 may determine whether to cleanse the client address entry. If the assignment level is equal to or greater than the minimum assignment level, address cleansing system 110 proceeds to 360 to generate a cleansed address. In an embodiment, address cleansing system 110 also logs the cleansing transaction. If the assignment level is less than the minimum assignment level and/or not greater than or equal to the minimum assignment level, address cleansing system 110 does not cleanse the address and instead generates a parsed address at 380.

At 360, address cleansing system 110 generates a cleansed address. Address cleansing system 110 may utilize the reference address data to replace, correct, and/or supplement the entry fields of the client address entry. Address cleansing system 110 may replace all of the entry fields or a portion of the entry fields. For example, even if the first five digits of a ZIP code are correct, address cleansing system 110 may supplement the address with four additional digits to cleanse the received client address entry. In another example, client address entry may include a business name which includes an office building address. Based on the business name and the reference address data, address cleansing system 110 may determine that the submitted suite number is incorrect. Address cleansing system 110 may supply the corrected suit number as the secondary address information to generate the cleansed address. In another embodiment, the client address entry may include an informal region identifier as the city data entry. Address cleansing system 110 may replace the informal region identifier with the city name. For example, the client address entry may include "Clarendon, Virginia" as county and state entry fields. Address cleansing system 110 may correct the entry field to instead accurately reflect the reference address data which may list the county as "Arlington County, Va."

In an embodiment, if the client address entry matches the reference address data, address cleansing system 110 may return client address entry as the cleansed address. In an embodiment, address cleansing system 110 may return the reference address data, which may include alterations to the formatting of the address. For example, the reference address data may list an apartment number in a separate entry field which differs from the house number.

In an embodiment, after generating a cleansed address, address cleansing system 110 transmits the cleansed address to the client device 120 that provided the client address entry.

At 370, when address cleansing system 110 generates a cleansed address, address cleansing system 110 may log the occurrence of address cleansing. In an embodiment, address cleansing system 110 is configured to monitor statistics related to the number of addresses cleansed. For example, address cleansing system 110 may track the number of addresses cleansed for each of the client devices 120 that utilize the cleansing services of address cleansing system 110.

In an embodiment address cleansing system 110 may log the cleansing transaction to generate an invoice for using the cleansing services. Address cleansing system 110 may transmit this invoice to a client device 120 that has requested address cleansing services. In an embodiment, address cleansing system 110 may maintain account information related to the client devices 120. At 370, address cleansing system 110 may deduct charges from the associated accounts.

In an embodiment, address cleansing system 110 may transmit logs of cleansing transactions to the owners of the geographic reference databases 140. In an embodiment, address cleansing system 110 may utilize the logs to determine royalty payments to be delivered to the owners of the geographic reference databases 140 based on the number of cleansed addresses.

At 380, if an assignment level of the client address entry is not equal to or greater than the minimum assignment level, address cleansing system 110 may generate a parsed version of the address. For example, at 330, address cleansing system 110 may have parsed and/or formatted the client address entry in order to determine the assignment level.

Based on this parsing, at 380, address cleansing system 110 may generate a parsed version of the address and return the parsed address to the client device 120 that provided the client address entry. In an embodiment, while not cleansed, the parsed address may be represented in a format that highlights validated entry fields, missing entry fields, and/or erroneous entry fields.

In an embodiment, at 380, address cleansing system 110 may also return diagnostic information such as an indication related to an error in the assignment level, the assignment level itself, an and/or error message to be deciphered at the client device 120.

In an embodiment, once a client device 120 receives either a cleansed addressed and/or a parsed address, the client device 120 may transmit a confirmation message to address cleansing system 110. In an embodiment, if the cleansed address is provided to the client device 120, the client device may confirm that cleansed address is desirable and should be utilized in place of the client address entry. In an embodiment, the client device 120 may device to change addresses even if the cleansed address is correct. For example, address cleansing system 110 may determine that the provided address matches reference address data but the client device 120 may have accidentally submitted an incorrect client address entry. Using this confirmation, client device 120 will be able to perform another check to ensure that the cleansed address is correct.

Similarly, if the client device 120 receives a parsed address and/or an indication that that the client address entry was not cleansed, client device 120 may interact with address cleansing system 110 via a confirmation message. For example, if the client address entry was not cleansed but the client device has submitted a correct address based on information local to the client device 120, the client device 120 may transmit a confirmation message to address cleansing system 110 indicating that the client address entry was correct. In this case, address cleansing system 110 and/or client server 250 may utilize the client address entry to perform other address-related actions, such as, for example, completing online shipping information.

In an embodiment, the client device 120 may submit a second client address entry in response to receiving the parsed address or an indication that the previously submitted client address entry was not cleansed. In an embodiment, address cleansing system 110 may then use the second client address entry to perform the other address-related actions. In an embodiment, address cleansing system 110 performs method 300 using the second client address entry to determine whether the second client address can be cleansed.

Figure 3B:
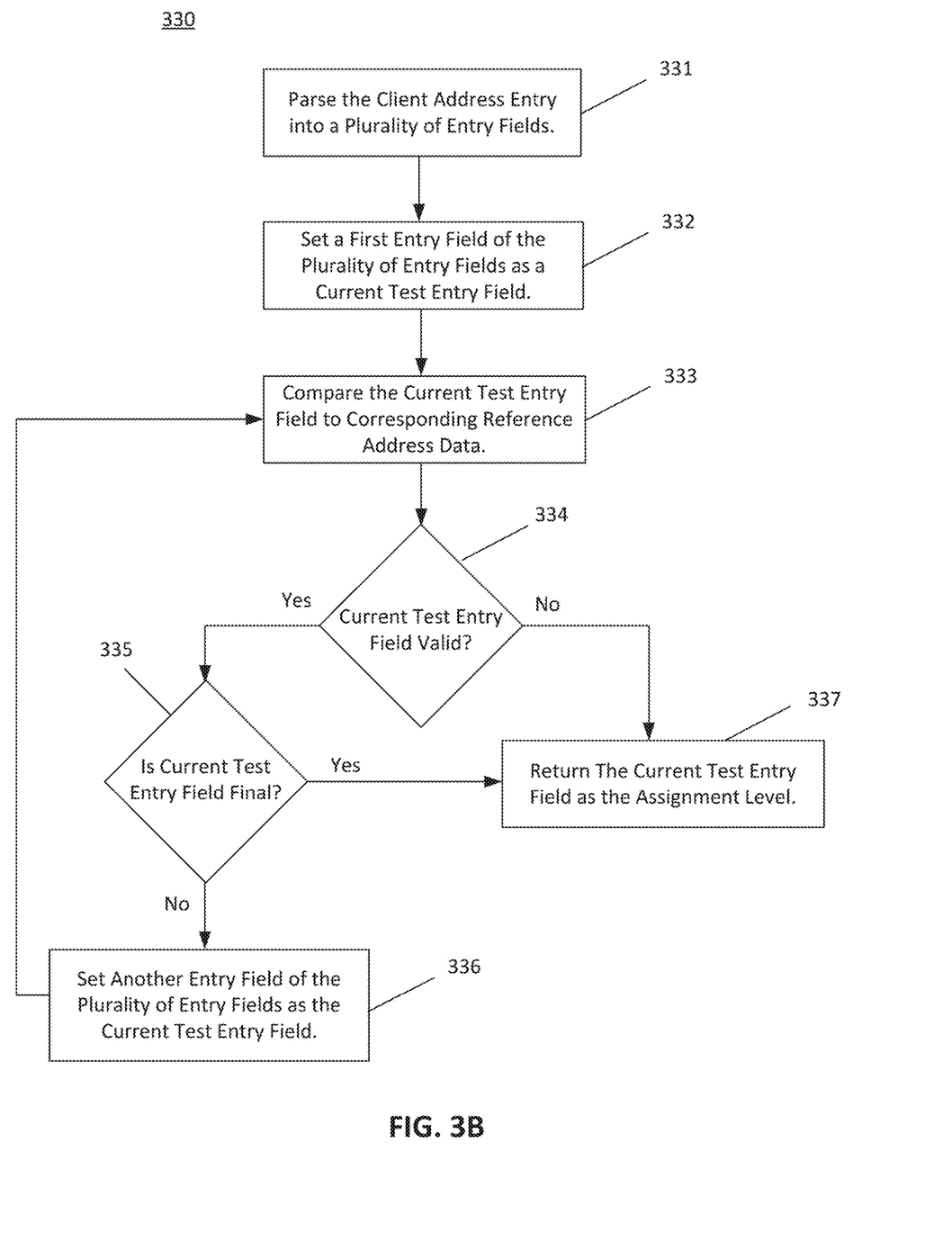
FIG. 3B is a flowchart illustrating a method for determining an assignment level of a client address entry, according to some embodiments.

FIG. 3B is a flowchart illustrating a method 330 for determining an assignment level of a client address entry, according to some embodiments. Method 330 shall be described with reference to FIG. 1 and FIG. 3A. However, method 330 is not limited to that example embodiment.

Address cleansing system 110 may utilize method 330 to determine an assignment level of a client address entry. The foregoing description will describe an embodiment of the execution of method 330 with respect to address cleansing system 110. While method 330 may be described with reference to address cleansing system 110, method 330 may be executed on any computing device, such as, for example, client server 250 and/or the computer system described with reference to FIG. 4 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 3B, as will be understood by a person of ordinary skill in the art.

In an embodiment, method 330 may be utilized when an address cleansing system 110 executes method 300 as described with reference to FIG. 3A. While method 300 represents a method for assignment level address cleansing, method 330 may be used to determine an assignment level of a client address entry.

At 331, address cleansing system 110 parses the client address entry into a plurality of entry fields. These entry fields are similar to the entry fields described with respect to FIG. 3A. For example, address cleansing system 110 may analyze the client address entry and parse the client address entry into country, region/state, city, various locality, street, house, floor, and/or unit information entry fields. Address cleansing system 110 may perform this parsing based on standard address formatting. This parsing then yields a plurality of distinct entry fields.

At 332, address cleansing system 110 sets the first entry field of the plurality of entry fields as a current test entry field. In an embodiment, the first entry field of the plurality of entry fields represents the entry field with the widest geographic area, such as, for example, a country status. If address cleansing system 110 is operating within a single country, however, in an embodiment, the first entry field may be a region/state and/or a city.

In an embodiment, the current test entry field is initialized at 332. The current test entry field represents an iterative entry field that is compared to reference address data. The current test entry field may act as a container for the different entry fields as the different entry fields are analyzed.

At 333, address cleansing system 110 compares the current test entry field with corresponding reference address data. At 334, address cleansing system 110 determines if the current test entry field is valid based on the retrieved reference address data. In an embodiment address cleansing system 110 retrieved reference address data at 320. In an embodiment, address cleansing system 110 retrieves reference address data from one or more geographic reference databases 140. Address cleansing system 110 then compares the data of the current test entry field to the reference address data to determine if current test entry field is valid.

For example, if the current test entry field includes a country parameter such as "Argentina," address cleansing system 110 will recognize "Argentina" as a valid country at 334 based on a comparison of a list of countries. If the current test entry field, however, lists "Pangaea" as the country, address cleansing system 110 will recognize an error and determine that the current test entry field is not valid. As the process iterates, different comparisons will be made based on different entry fields.

Based on the country data field occupying the current test entry field, however, if the current test entry field is valid, address cleansing system will determine whether the current test entry field is the final entry field of the plurality of entry fields at 335. In an embodiment, as the entry fields are iterated from widest geographic region to narrowest geographic region, at 335, address cleansing system 110 will determine if any other entry fields are remaining to determine validation. If the current test entry field is not the final entry field of the plurality of entry fields, at 336, address cleansing system 110 sets another entry field of the plurality of entry fields as the current test entry field. In an embodiment, at 336, the next narrowest geographic region entry field is selected and set as the new current test entry field. Based on the previous validation, the new current test entry field is again compared at 333 to corresponding reference address data to determine if the new current test entry field is also valid.

For example, if the first current test entry field was for a country and included "Argentina," address cleansing system 110 would recognize this entry as valid at 334. Because other address information may exist, at 335, address cleansing system 110 would determine that the current test entry field (i.e., country) is not the final entry field of the plurality of entry fields. At 336, address cleansing system 110 would then set the next narrowest geographic entry field. For example, at 336, address cleansing system 110 would replace "country" as the current test entry field with "region." Address cleansing system 110 would then compare the region information at 333 with reference address data to determine whether the region information was valid. If so, address cleansing system 110 would continue to narrow the entry field until either (A) the current test entry field is determined not to be valid at 334 or (B) the current test entry field is determined to be the final entry field of the plurality of entry fields at 335.

Once either of these conditions are met, at 337, address cleansing system 110 returns the current test entry field as the assignment level. In an embodiment, this assignment level is the assignment level determined at 330 in method 300. If 337 is arrived at from 334, wherein the current test entry field is determined to be not valid, the assignment level will reflect that the currently tested entry field is not valid. For example, if the country of "Argentina" is validated, but the region of "Sao Paulo" is listed in the "region" entry field and found invalidated, at 337, address cleansing system 110 returns an indication stating that the region entry field is not validated. Method 300 may then utilize this information when determining whether to cleanse the address.

In contrast, in an embodiment where 337 is arrived at from 335, address cleansing system 110 will return an indication that the provided client address entry is validated due to the plurality of entry fields being validated. In this case, the assignment level will indicate that the current test entry field (i.e., the final entry field of the plurality of entry fields) has been validated. This validation thus represents validation of the client address entry with no errors. Through the execution of method 330, address cleansing system 110 will be able to determine an assignment level of the client address entry, allowing method 300 to determine whether or not to cleanse the address of the client address entry.

Figure 4:
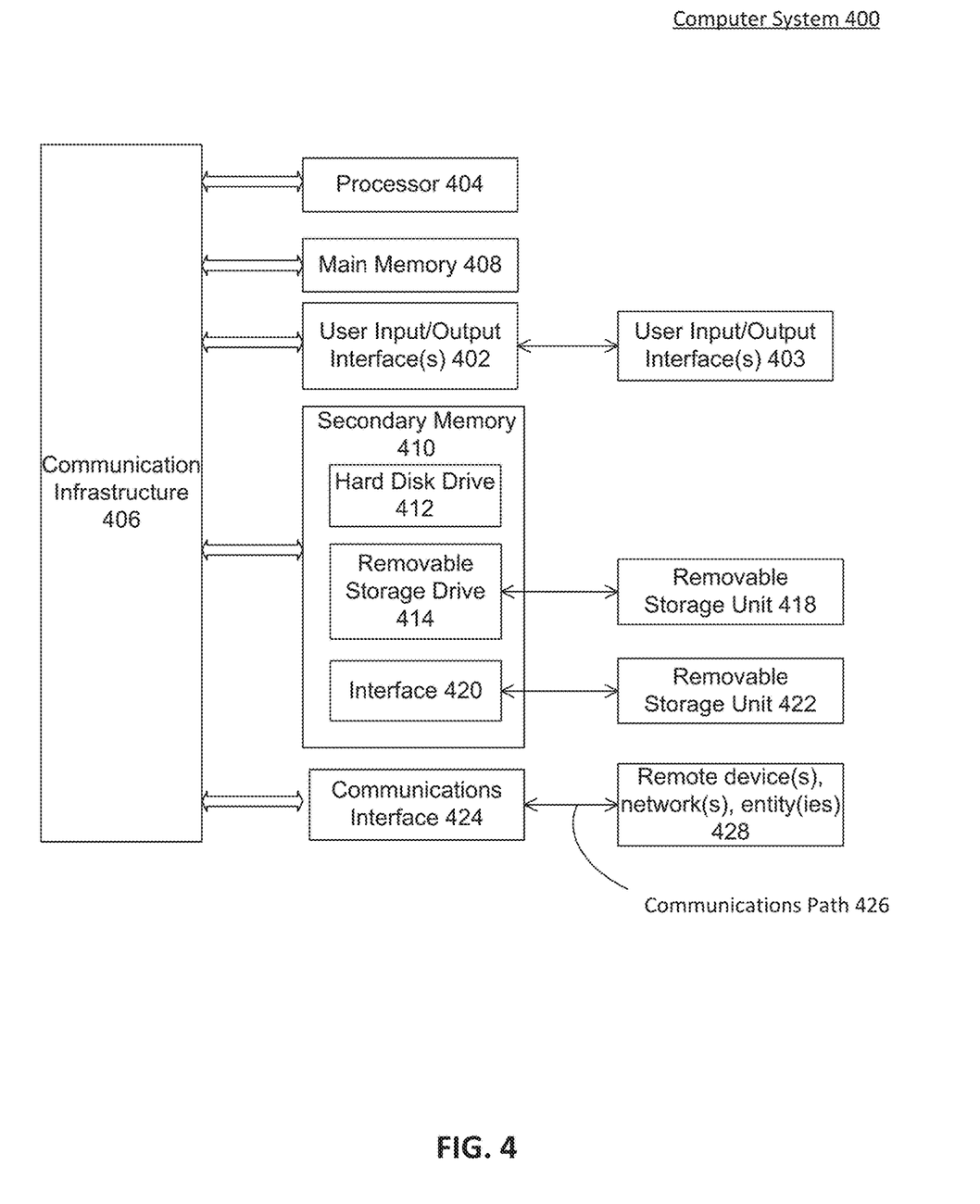
FIG. 4 is an example computer system useful for implementing various embodiments.

Referring now to FIG. 4, various embodiments of can be implemented, for example, using one or more computer systems, such as computer system 400 shown in FIG. 4. One or more computer systems 400 (or portions thereof) can be used, for example, to implement methods 300 and 330 of FIG. 3A and FIG. 3B.

Computer system 400 can be any well-known computer capable of performing the functions described herein.

Computer system 400 includes one or more processors (also called central processing units, or CPUs), such as a processor 404. Processor 404 is connected to a communication infrastructure or bus 406.

One or more processors 404 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402.

Computer system 400 also includes a main or primary memory 408, such as random access memory (RAM). Main memory 408 may include one or more levels of cache. Main memory 408 has stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/or any other computer data storage device. Removable storage drive 414 reads from and/or writes to removable storage unit 418 in a well-known manner.

According to an exemplary embodiment, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communications path 426.

In an embodiment, a tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments using data processing devices, computer systems and/or computer architectures other than that shown in FIG. 4. In particular, embodiments may operate with software, hardware, and/or operating system implementations other than those described herein.

It is to be appreciated that the Detailed Description section, and not the Abstract section, is intended to be used to interpret the claims. The Abstract section may set forth one or more but not all exemplary embodiments as contemplated by the inventor(s), and thus, are not intended to limit the disclosure or the appended claims in any way.

While the disclosure has been described herein with reference to exemplary embodiments for exemplary fields and applications, it should be understood that the scope of the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of disclosed inventions should not be limited by any of the above-described exemplary embodiments, but should be defined only in accordance with the following claims and their equivalents.

What is claimed is:

1. A computer-implemented method, comprising:
receiving an address from a client device;
parsing the address into a plurality of entry fields representing different geographic region fields;
comparing entry fields of the plurality of entry fields to reference address data to determine an assignment level of the address, wherein the assignment level represents an achieved level of address validation;
comparing the assignment level of the address to a minimum assignment level threshold;
in response to determining that the assignment level of the address equals or exceeds the minimum assignment level threshold, generating a cleansed version of the address using the reference address data; and
in response to determining that the assignment level of the address is less than the minimum assignment level threshold, generating a parsed version of the address and transmitting the parsed version of the address to the client device.

2. The computer-implemented method of claim 1, wherein the entry fields of the plurality of entry fields are linearly and iteratively compared to the reference address data.

3. The computer-implemented method of claim 1, further comprising:
in response to generating a cleansed version of the address, storing a log of the generating in memory.

4. The computer-implemented method of claim 1, further comprising:
in response to determining that the assignment level of the address is less than the minimum assignment level threshold, generating an error message indicating that the address has not been cleansed and transmitting the error message to the client device.

5. The computer-implemented method of claim 1, wherein generating a cleansed version of the address includes replacing data of an entry field of the plurality of entry fields with reference address data corresponding to the entry field.

6. The computer-implemented method of claim 1, wherein generating a cleansed version of the address includes appending reference address data to a blank entry field of the plurality of entry fields.

7. The computer-implemented method of claim 1, wherein the client device is a server.

8. A system, comprising:
a memory; and
one or more processors coupled to the memory and configured to:
receive an address from a client device;
parse the address into a plurality of entry fields representing different geographic region fields;
compare entry fields of the plurality of entry fields to reference address data to determine an assignment level of the address, wherein the assignment level represents an achieved level of address validation;
compare the assignment level of the address to a minimum assignment level threshold;
in response to determining that the assignment level of the address equals or exceeds the minimum assignment level threshold, generate a cleansed version of the address using the reference address data; and
in response to determining that the assignment level of the address is less than the minimum assignment level threshold, generate a parsed version of the address and transmitting the parsed version of the address to the client device.

9. The system of claim 8, wherein the entry fields of the plurality of entry fields are linearly and iteratively compared to the reference address data.

10. The system of claim 8, wherein the one or more processors are further configured to:
in response to generating a cleansed version of the address, store a log of the generating in the memory.

11. The system of claim 8, wherein the one or more processors are further configured to:
in response to determining that the assignment level of the address is less than the minimum assignment level threshold, generate an error message indicating that the address has not been cleansed and transmitting the error message to the client device.

12. The system of claim 8, wherein to generate a cleansed version of the address, the one or more processors are further configured to replace data of an entry field of the plurality of entry fields with reference address data corresponding to the entry field.

13. The system of claim 8, wherein to generate a cleansed version of the address, the one or more processors are further configured to append reference address data to a blank entry field of the plurality of entry fields.

14. The system of claim 8, wherein the client device is a server.

15. A tangible, non-transitory computer-readable device having instructions stored thereon that, when executed by at least one computing device, causes the at least one computing device to perform operations comprising:
   receiving an address from a client device;
   parsing the address into a plurality of entry fields representing different geographic region fields;
   comparing entry fields of the plurality of entry fields to reference address data to determine an assignment level of the address, wherein the assignment level represents an achieved level of address validation;
   comparing the assignment level of the address to a minimum assignment level threshold;
   in response to determining that the assignment level of the address equals or exceeds the minimum assignment level threshold, generating a cleansed version of the address using the reference address data; and
   in response to determining that the assignment level of the address is less than the minimum assignment level threshold, generate a parsed version of the address and transmitting the parsed version of the address to the client device.

16. The tangible, non-transitory computer-readable device of claim 15, wherein the entry fields of the plurality of entry fields are linearly and iteratively compared to the reference address data.

17. The tangible, non-transitory computer-readable device of claim 15, the operations further comprising:
   in response to generating a cleansed version of the address, storing a log of the generating in memory.

18. The tangible, non-transitory computer-readable device of claim 15, wherein generating a cleansed version of the address includes replacing data of an entry field of the plurality of entry fields with reference address data corresponding to the entry field.

19. The tangible, non-transitory computer-readable device of claim 15, wherein generating a cleansed version of the address includes appending reference address data to a blank entry field of the plurality of entry fields.

20. The tangible, non-transitory computer-readable device of claim 15, wherein the client device is a server.

* * * * *